United States Patent
Lee

(10) Patent No.: US 8,953,725 B1
(45) Date of Patent: Feb. 10, 2015

(54) MIMO REPEATER SYSTEM AND METHOD FOR CANCELING FEEDBACK INTERFERENCE USING THE SAME

(71) Applicant: SNU R&DB Foundation, Seoul (KR)

(72) Inventor: Jung Woo Lee, Seoul (KR)

(73) Assignee: SNU R&DB Foundation, Seoul (KR)

( * ) Notice: Subject to any disclaimer, the term of this patent is extended or adjusted under 35 U.S.C. 154(b) by 0 days.

(21) Appl. No.: 14/066,941

(22) Filed: Oct. 30, 2013

(30) Foreign Application Priority Data

Oct. 1, 2013 (KR) .......................... 10-2013-0117250

(51) Int. Cl.
*H04B 1/10* (2006.01)
*H04B 7/155* (2006.01)

(52) U.S. Cl.
CPC .................................. *H04B 7/15585* (2013.01)
USPC ........................................................ 375/346

(58) Field of Classification Search
CPC ........ H04B 1/10; H04B 1/109; H04B 1/1081; H04B 1/1027
USPC ........................................................ 375/346
See application file for complete search history.

(56) References Cited

U.S. PATENT DOCUMENTS

| | | | |
|---|---|---|---|
| 8,638,835 B2 * | 1/2014 | Wang et al. | 375/211 |
| 2006/0264174 A1 * | 11/2006 | Moss | 455/16 |
| 2011/0195657 A1 * | 8/2011 | Takeda et al. | 455/7 |

FOREIGN PATENT DOCUMENTS

| KR | 1020070106363 A | 11/2007 |
|---|---|---|
| KR | 100862715 B1 | 10/2008 |
| KR | 1020080112829 A | 12/2008 |
| KR | 1020090058962 A | 6/2009 |

* cited by examiner

*Primary Examiner* — Kevin Kim
(74) *Attorney, Agent, or Firm* — William Park & Associates Patent Ltd.

(57) ABSTRACT

Provided is a MIMO repeater system including a plurality of repeaters. Each of the repeaters includes: an Rx antenna; a receiver configured to convert a signal received through the Rx antenna into a digital signal; an interference cancellation unit configured to cancel interference from an output signal of the receiver; a transmitter configured to convert an output signal of the interference cancellation unit into an analog signal; and a Tx antenna configured to transmit an output signal of the transmitter, and the interference cancellation to unit provided in each of the repeaters receives the output signal of the receiver as an input signal, receives reference signals provided from the plurality of repeaters as a reference signal vector, outputs a prediction signal according to a current filter coefficient vector generated in response to the input signal and the reference signal vector, and cancels the prediction signal from the input signal.

7 Claims, 5 Drawing Sheets

MIMO REPEATER SYSTEM AND METHOD FOR CANCELING FEEDBACK INTERFERENCE USING THE SAME

CROSS-REFERENCES TO RELATED APPLICATION

The present application claims priority under 35 U.S.C. §119(a) to Korean application number 10-2013-0117250, filed on Oct. 1, 2013, in the Korean Intellectual Property Office, which is incorporated herein by reference in its entirety.

BACKGROUND

1. Technical Field

Various embodiments relate to a wireless communication apparatus, and more particularly, to a multi-input multi-output (MIMO) repeater system and a method for canceling feedback interference using the same.

2. Related Art

In general, a repeater is used in a mobile communication system, in order to expand the coverage of the mobile communication system in a shadow area where the intensity of radio waves from a base station decreases or an area remote from the base station.

The repeater includes an optical repeater using an optical cable and a wireless repeater which wirelessly receives a signal from a base station and wirelessly transmits the received signal.

The optical repeater guarantees stable performance. However, since the optical cable must be installed or rented, the cost inevitably increases. Since the wireless repeater does not need an optical cable, an installation place may be freely selected, maintenance and repair may be easily performed, and the frequency may be reused.

FIG. 1 is a conceptual view of a conventional wireless repeater.

A repeater 3 receives a signal which is wirelessly transmitted from a base station 1. The repeater 3 amplifies the received signal and then transmits the amplified signal as a wireless signal to a terminal 5.

Since the received signal and the transmitted signal of the wireless repeater use the same frequency, isolation between transmit (Tx) and receive (Rx) antennas must be sufficiently secured. Otherwise, a signal transmitted from the Tx antenna may be fed back to the Rx antenna. Then, since the original signal transmitted from the base station 1 is coupled to the feedback signal, oscillation may occur.

In order to solve such a problem, an interference cancellation system (ICS) capable of canceling feedback interference may be employed. FIG. 2 illustrates an example of the ICS.

Referring to FIG. 2, the ICS repeater 10 having a feedback interference cancellation function includes an Rx antenna 101, a first signal processing unit 103, an interference cancellation unit 105, a second signal processing unit 107, and a Tx antenna 109.

The Rx antenna 101 is configured to receive a radio frequency (RF) signal from a base station. The first signal processing unit 103 is configured to convert the RF signal received through the Rx antenna 101 into a baseband digital signal.

The interference cancellation unit 105 is configured to estimate and cancel an interference signal from the output signal of the first signal processing unit 103 and then output the signal.

The second signal processing unit 107 is configured to adjust the frequency band of the signal, from which the feedback interference is canceled by the interference cancellation unit 105, to a high-frequency band, convert the adjusted signal into an analog signal, and transit the analog signal through the Tx antenna 109.

The ICS repeater 10 is a system capable of estimating and canceling a feedback interference signal received by a repeater. When the Tx and Rx antennas can be isolated at a sufficient distance from each other, the ISC repeater does not need to be used. However, since an indoor repeater for domestic use cannot sufficiently secure isolation between the Tx and Rx antennas, the ISC repeater is used to prevent oscillation of the repeater. Furthermore, since the ICS repeater has a low installation cost, the ICS repeater is preferred in mountain and island areas.

The ICS repeater is designed under the supposition that a single antenna is used. However, in third-generation mobile communication systems or fourth-generation mobile communication systems such as LTE (Long Term Evolution) and Mobile WiMax, a base station and a terminal use multiple antennas. Thus, a repeater uses multiple antennas to repeat a signal.

FIG. 3 is a schematic view of a multi-input multi-output (MIMO) repeater system.

The MIMO repeater system 20 includes a plurality of Rx antennas 201, a repeater 203, and a plurality of Tx antennas 205. The repeater 203 is configured to repeat signals of the Rx antennas 201, and the plurality of Tx antennas 205 are configured to transmit the repeated signals in a wireless manner. The respective Tx antennas 205 transmit different signals to a terminal.

In such a MIMO repeater system, since different signals transmitted from the plurality of Tx antennas 205 are fed back to the respective Rx antennas 201, signals fed back to one Rx antenna may include a signal transmitted from a Tx antenna connected to the Rx antenna and signals transmitted from other Tx antennas.

Thus, there is an urgent demand for a feedback interference cancellation technique for the MIMO repeater system.

SUMMARY

In an embodiment of the present invention, there is provided a MIMO repeater system including a plurality of repeaters. Each of the repeaters includes: a receive (Rx) antenna; a receiver configured to convert a signal received through the Rx antenna into a digital signal; an interference cancellation unit configured to cancel interference from an output signal of the receiver; a transmitter configured to convert an output signal of the interference cancellation unit into an analog signal; and a transmit (Tx) antenna configured to transmit an output signal of the transmitter, and the interference cancellation unit provided in each of the repeaters receives the output signal of the receiver as an input signal, receives reference signals provided from the plurality of repeaters as a reference signal vector, outputs a prediction signal according to a current filter coefficient vector generated in response to the input signal and the reference signal vector, and cancels the prediction signal from the input signal.

In an embodiment of the present invention, there is provided a method for canceling feedback interference in a MIMO repeater system which includes a plurality of repeaters each including an Rx antenna, a receiver configured to convert a signal received by the Rx antenna into a digital signal, an interference cancellation unit configured to cancel interference from an output signal of the receiver, a transmitter configured to convert an output signal of the interference cancellation unit into an analog signal; and a Tx antenna configured to transmit an output signal of the transmitter. The method includes the steps of: receiving, by the interference cancellation unit, an output signal of the receiver; receiving reference signals provided from the plurality of repeaters as a reference signal vector; generating a prediction signal according to a current filter coefficient vector generated in response to the input signal and the reference signal vector; and canceling the prediction signal from the input signal.

BRIEF DESCRIPTION OF THE DRAWINGS

Features, aspects, and embodiments are described in conjunction with the attached drawings, in which.

DETAILED DESCRIPTION

Hereinafter, a multi-input multi-output (MIMO) repeater system and a method for canceling feedback interference using the same according to the present invention will be described below with reference to the accompanying drawings through exemplary embodiments.

Figure 1:
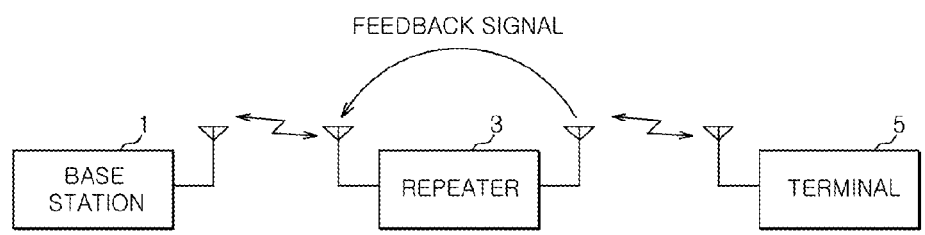
FIG. 1 is a conceptual view of a conventional wireless repeater.
Figure 2:
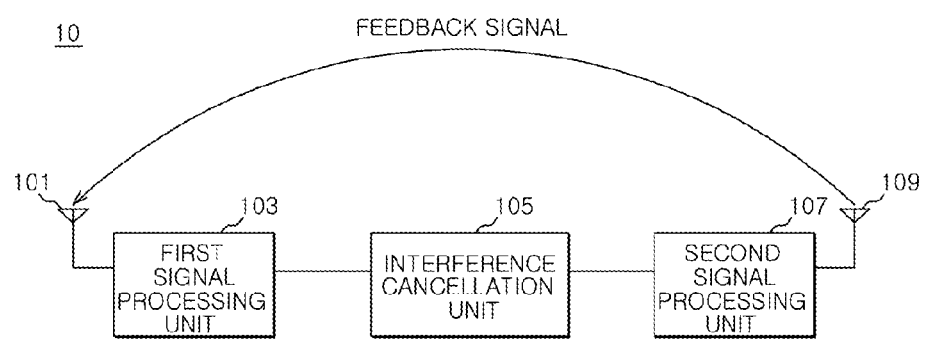
FIG. 2 is a configuration diagram of a wireless repeater having a feedback interference cancellation function.
Figure 3:
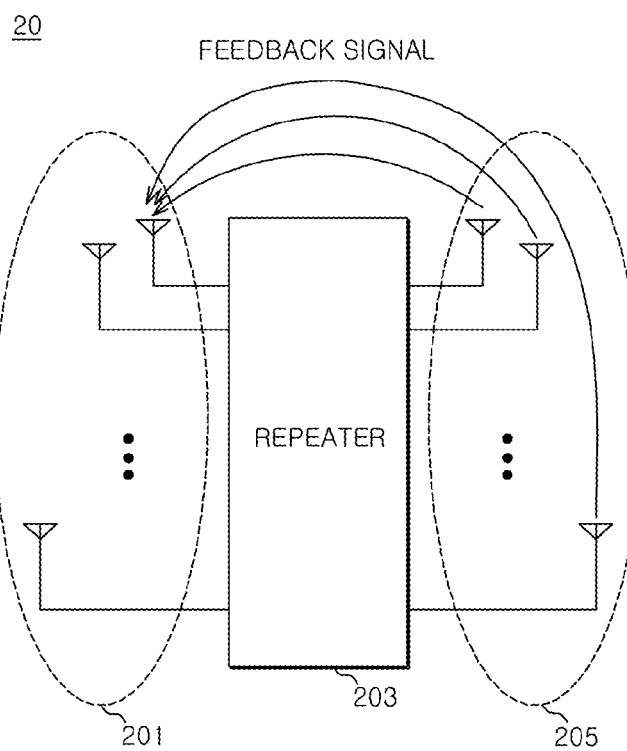
FIG. 3 is a conceptual view of a multi-input multi-output (MIMO) repeater system.
Figure 4:
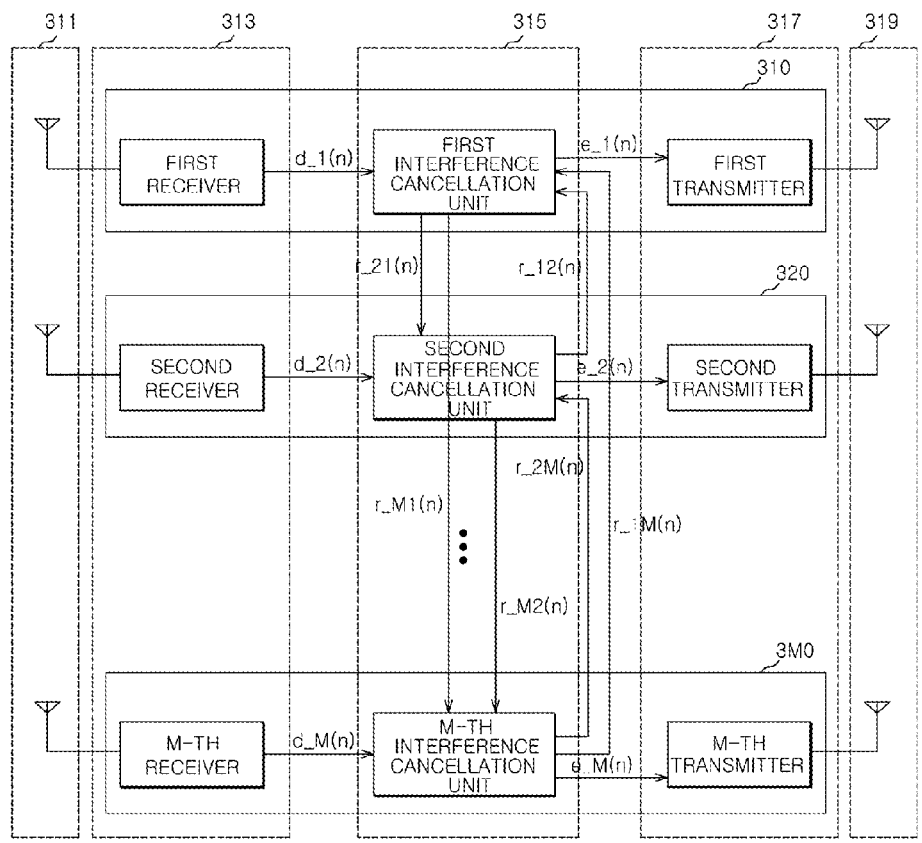
FIG. 4 is a configuration diagram of a MIMO repeater system according to an embodiment of the present invention.

FIG. 4 is a configuration diagram of a MIMO repeater system according to an embodiment of the present invention. Referring to FIG. 4, the MIMO repeater system 30 according to the embodiment of the present invention may include a plurality of repeaters 310, 320, ..., 3M0.

Each of the repeaters 310, 320, ..., 3M0 includes an Rx antenna 311, a receiver 313, an interference cancellation unit 315, a transmitter 317, and a Tx antenna 319.

The receiver 313 is configured to convert an RF signal received by the Rx antenna 311 into a baseband digital signal and output the digital signal. At this time, an original signal transmitted from a base station and interference signals fed back from a plurality of Rx antennas 319 are mixed in the RF signal received by the Rx antenna 311.

The interference cancellation unit 315 is configured to receive a digital Rx signal (scalar) outputted from the receiver 313 as an input signal $d\_i(n)$ at a time point n, where i is a natural number ranging from 1 to M. Furthermore, in order to cancel the interference signals fed back from the plurality of Tx antennas, the interference cancellation unit 315 receives reference signals $r\_ij(n)$ provided from all of the repeaters 310, 320, ..., 3M0 constituting the MIMO repeater system 30 as a reference signal vector $(r\_i(n)=[r\_i1(n), r\_i2(n), ..., r\_iM(n)]^T)$. The reference signal vector may include a vector matrix having M rows. Here, i and j are natural numbers ranging from 1 to M (number of repeaters), and $r\_ij$ indicates a reference signal provided from a repeater j to a repeater i.

The reference signals generated from the respective repeaters 310, 320, ..., 3M0 may be based on error signals $e\_i(n)$ (scalar) which are final output signals of the respective repeaters. For example, the reference signals may be generated by delaying the error signals $e\_i(n)$ by a predetermined time. Furthermore, the interference cancellation unit 315 may generate a filter coefficient vector $(w\_i(n)=[w\_i1(n), w\_i2(n), ..., w\_iM(N)]^T)$ using the reference signal vector $r\_i(n)$ and the input signal $d\_i(n)$, and filter the reference signal vector $r\_i(n)$ according to the filter coefficient vector $w\_i(n)$, thereby outputting prediction signals $y\_i(n)$ (scalar). The prediction signals $y\_i(n)$ are canceled from the input signal $d\_i(n)$, and thus the error signals $e\_i(n)$ are outputted as final output signals of the interference cancellation unit 315.

The transmitter 317 is configured to convert the error signals $e\_i(n)$ outputted from the interference cancellation unit 315 into RF analog signals and output the RF analog signals to the Tx antenna 319.

Figure 5:
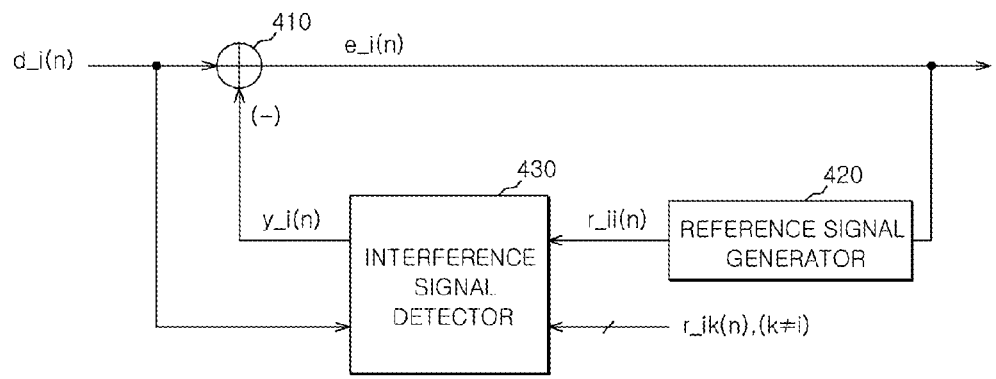
FIG. 5 is a diagram illustrating an interference cancellation unit of FIG. 4.

FIG. 5 is a diagram illustrating the interference cancellation unit of FIG. 4.

Referring to FIG. 5, the interference cancellation unit 40 may include an interference signal canceller 410, a reference signal generator 420, and an interference signal detector 430. In the present embodiment, the interference cancellation unit 40 may include an adaptive filter.

FIG. 5 illustrates the interference cancellation unit 40 included in an i-th repeater 3i0 among the M repeaters 310, 320, ..., 3M0.

At a time point n, the i-th interference cancellation unit 40 receives a mixed signal of an original signal converted into a digital signal and a feedback interference signal as an input signal $d\_i(n)$ from the receiver 313. The interference signal canceller 410 cancels a prediction signal $y\_i(n)$ outputted from the interference signal detector 430 from the input signal $d\_i(n)$, and outputs an error signal $e\_i(n)$ as a final output signal.

When the error signal $e\_i(n)$ is provided to the transmitter 317, the error signal $e\_i(n)$ is also provided to the reference signal generator 420 and then used for estimating an interference signal of the input signal $d\_i(n)$ from the interference cancellation unit 40. That is, the reference signal generator 420 may generate a reference signal $r\_ii(n)$ by delaying the error signal $e\_i(n)$ by a predetermined time.

The interference signal detector 430 receives the reference signals $r\_ik(n)$ generated from all of the repeaters 310, 320, ..., 3M0 constituting the MIMO repeater system 30 as a reference signal vector $(r\_i(n)=[r\_i1(n), r\_i2(n), ..., r\_iM(n)]^T)$ while receiving the input signal $d\_i(n)$, where k is a natural number ranging from 1 to M. Furthermore, the interference signal detector 430 generates a current filter coefficient vector $w\_i(n)$ using a previous filter coefficient vector $w\_i(n-1)$. Then, the interference signal detector 430 filters the reference signal vector $r\_i(n)$ through the current filter coefficient vector $w\_i(n)$, and outputs a prediction signal $y\_i(n)$.

It is known that a repeater system using a single antenna employs an adaptive filter to cancel feedback interference. At the time point n, a filter tap vector $w(n)$ of the adaptive filter, that is, a filter coefficient is given as $w(n)=(w_1, w_2, ..., w_L)^T$, when a filter tap size is set to L. The filter coefficient may be generated by applying the LMS (Least Mean Squared) algorithm, the RLS (Recursive Least Squared) algorithm, or a variant thereof. Furthermore, the reference signal $r(n)$ is also a vector, and given as $r=(r(n), r(n-1), ..., r(n-L+1))^T$.

Thus, in the single antenna repeater system, the following relation may be established.

$$y(n)=w(n)^H r$$

$$e(n)=d(n)-y(n)$$

In order to cancel feedback interference in the MIMO repeater system using M antennas, the tap size of the adaptive filter is expanded to M*L. Furthermore, the magnitude of the reference signal vector is expanded M times, and the i-th repeater 3i0 uses the following reference signal vector r_i.

$$r\_i = \begin{bmatrix} r\_{i1} \\ r\_{i2} \\ \vdots \\ r\_{i(M-1)} \\ r\_{iM} \end{bmatrix}$$

Furthermore, a channel through signals are fed back to any one Rx antenna from the respective Tx antennas is estimated by the unit of L taps. The filter coefficient vector w_i(n) corresponding to the result of the channel estimation may be expressed as follows.

$$w\_i(n) = \begin{bmatrix} w\_{i1}(n) \\ w\_{i2}(n) \\ \vdots \\ w\_{i(M-1)}(n) \\ w\_{iM}(n) \end{bmatrix}$$

Here, w_ij(n) represents a filter coefficient having a magnitude of L and corresponding to a feedback channel through which a signal is fed back to an Rx antenna of the repeater i from a Tx antenna of the repeater j where j is a natural number ranging from 1 to M. Furthermore, r_ij represents a reference signal provided from the repeater i to the repeater j and having a magnitude of L.

When supposing that the number of antennas is two, a tap size is set to 2L, first L taps estimate a channel through which a signal is fed back from one Tx antenna to a corresponding Rx antenna, and the other L taps estimate a channel through which a signal is fed back from another Tx antenna to the one Tx antenna.

When the number of antennas is two, the filter coefficient vectors w1(n) and w2(n) and the reference signal vectors r1 and r2 of the first and second repeaters 310 and 320 may be expressed as follows.

$$w_1(n) = \begin{bmatrix} w_{11}(n) \\ w_{12}(n) \end{bmatrix}$$

$$r_1 = \begin{bmatrix} r_{11} \\ r_{12} \end{bmatrix}$$

$$w_2(n) = \begin{bmatrix} w_{21}(n) \\ w_{22}(n) \end{bmatrix}$$

$$r_2 = \begin{bmatrix} r_{21} \\ r_{22} \end{bmatrix}$$

When the filter coefficient vectors and the reference signal vectors of the respective repeaters 310, 320, . . . , 3M0 are defined in the above-described manner, an adaptive filter for the MIMO repeater system may be implemented on the basis the principle of the adaptive filter algorithm of the single antenna repeater system.

Figure 6:
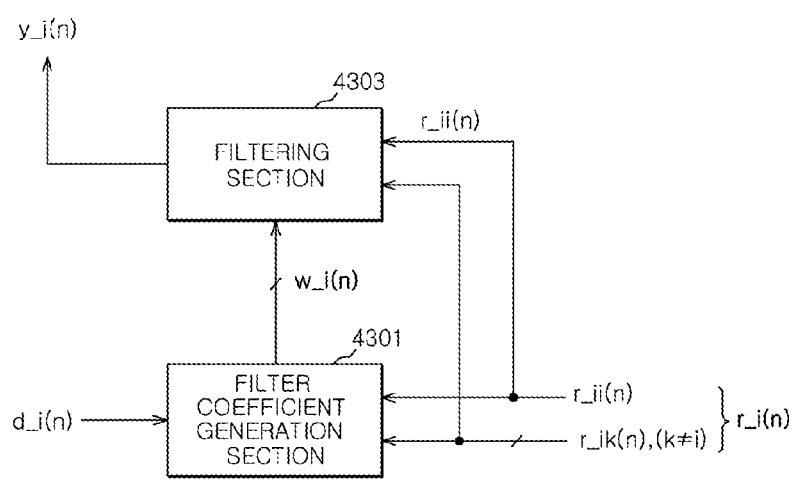
FIG. 6 is a diagram illustrating an interference signal detector of FIG. 5.

FIG. 6 is a diagram illustrating the interference signal detector of FIG. 5.

The interference signal detector 430 of the i-th repeater 3i0 may include a filter coefficient generation section 4301 and a filtering section 4303.

The filter coefficient generation section 4301 calculates an error contained in the input signal d_i(n) in response to the input signal d_i(n), the reference signal vector r_i(n), and the previous filter coefficient vector w_i(n−1). Then, the filter coefficient generation section 4301 generates the current filter coefficient vector w_i(n) using the calculated error, the previous filter coefficient vector w_i(n−1), and the reference signal vector r_i(n). In order to generate the current filter coefficient vector w_i(n), the LMS algorithm, the RLS algorithm or a variant thereof may be used.

The filtering section 4303 is configured to filter the reference signal vector r_i(n) through the filter coefficient vector w_i(n), and output the prediction signal y_i(n).

Figure 7:
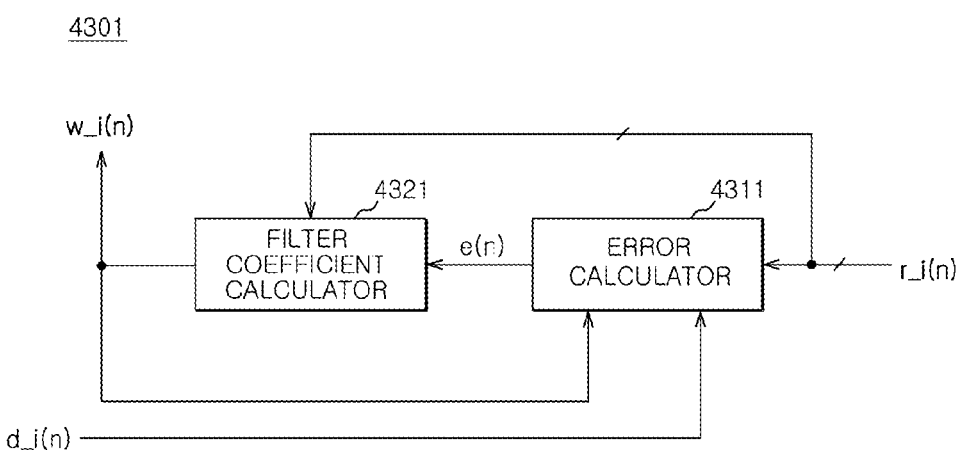
FIG. 7 is a diagram illustrating a filter coefficient generation section of FIG. 6.

The filter coefficient generation section 4301 may be configured as illustrated in FIG. 7.

FIG. 7 is a diagram illustrating the filter coefficient generation section 4301 including an error calculator 4311 and a filter coefficient calculator 4321.

The error calculator 4311 is configured to calculate an error e(n) contained in the input signal d_i(n) in response to the input signal d_i(n), the reference signal vector r_i(n), and the previous filter coefficient vector w_i(n−1).

In order to calculate the error e(n), the following method may be applied:

$$e(n)=(d\_i(n)-w\_i(n-1)^H r\_i(n)) \quad (H: \text{Hermitian matrix}).$$

The filter coefficient calculator 4321 calculates the current filter coefficient vector w_i(n) in response to the output signal e(n) of the error calculator 4311, the reference signal vector r_i(n), and the previous filter coefficient vector w_i(n−1).

The filter coefficient calculator 4321 may calculate the current filter coefficient vector w_i(n) through the following method:

$$w\_i(n)=[w-i(n-1)+F(r\_i(n)e(n))].$$

The function F(•) may be set according the type of the algorithm of the adaptive filter (LMS, RLS, or a variant thereof).

As described above, the prediction signal y_i(n) is provided to the interference signal canceller 410, and the error signal e_i(n) obtained by canceling the prediction signal y_i(n) from the input signal d_i(n) is outputted. In order to generate the prediction signal y_i(n), an inner product of the filter coefficient vector (w_i(n))$^H$ and the reference signal vector r_i(n) may be calculated.

In the MIMO repeater system according to the embodiment of the present invention, the filter coefficient vector and the reference signal vector are increased by the number of antennas, that is, by the number of repeaters mounted therein, compared to the single antenna repeater system. Furthermore, through the increased filter coefficient vector and the increase reference signal vector, the algorithm of the known adaptive filter may be used as it is. Furthermore, when M antennas are provided, M independent adaptive filters may be executed to independently cancel interference signals fed backed to the respective Rx antennas.

While certain embodiments have been described above, it will be understood to those skilled in the art that the embodiments described are by way of example only. Accordingly, the MIMO repeater system described herein should not be limited based on the described embodiments. Rather, the MIMO repeater system described herein should only be limited in light of the claims that follow when taken in conjunction with the above description and accompanying drawings.

What is claimed is:

1. A multi-input multi-output (MIMO) repeater system comprising a plurality of repeaters,
wherein each of the repeaters comprises:
a receive (Rx) antenna;
a receiver configured to convert a signal received through the Rx antenna into a digital signal;
an interference cancellation unit configured to cancel interference from an output signal of the receiver, wherein the interference cancellation unit comprises:
an interference signal canceller configured to cancel the prediction signal from the input signal and generate an error signal;
a reference signal generator configured to generate a reference signal based on the error signal; and
an interference signal detector configured to generate the current filter coefficient vector in response to the input signal, the reference signal vector, and a previous filter coefficient vector, and output the prediction signal by filtering the reference signal vector through the current filter coefficient vector;
a transmitter configured to convert an output signal of the interference cancellation unit into an analog signal; and
a transmit (Tx) antenna configured to transmit an output signal of the transmitter, and
the interference cancellation unit provided in each of the repeaters receives the output signal of the receiver as an input signal, receives reference signals provided from the plurality of repeaters as a reference signal vector, outputs a prediction signal according to a current filter coefficient vector generated in response to the input signal and the reference signal vector, and cancels the prediction signal from the input signal.

2. The MIMO repeater system according to claim 1, wherein the interference signal detector comprises:
a filter coefficient generation section configured to estimate a channel of a feedback interference signal according to the current filter coefficient vector generated in response to the input signal, the reference signal vector, and the previous filter coefficient vector; and
a filtering section configured to output the prediction signal by filtering the reference signal vector through the filter coefficient vector.

3. The MIMO repeater system according to claim 2, wherein the filter coefficient generation section comprises:
an error calculator configured to calculate an error contained in the input signal in response to the input signal, the reference signal vector, and the previous filter coefficient vector; and a filter coefficient calculator configured to calculate the current filter coefficient vector in response to the error, the reference signal vector, and the previous filter coefficient vector.

4. The MIMO repeater system according to claim 2, wherein the filtering section calculates an inner product of the filter coefficient vector and the reference signal vector.

5. A method for canceling feedback interference in a MIMO repeater system which includes a plurality of repeaters each including an Rx antenna, a receiver configured to convert a signal received by the Rx antenna into a digital signal, an interference cancellation unit configured to cancel interference from an output signal of the receiver, a transmitter configured to convert an output signal of the interference cancellation unit into an analog signal; and a Tx antenna configured to transmit an output signal of the transmitter, the method comprising the steps of:
receiving, by the interference cancellation unit, an output signal of the receiver;
receiving reference signals provided from the plurality of repeaters as a reference signal vector;
generating a prediction signal according to a current filter coefficient vector generated in response to the input signal and the reference signal vector, wherein the step of generating the prediction signal comprises the steps of:
generating the current filter coefficient vector in response to the input signal, the reference signal vector and a previous filter coefficient vector; and
outputting the prediction signal by filtering the reference signal vector through the current filter coefficient vector; and
canceling the prediction signal from the input signal.

6. The method according to claim 5, wherein the step of generating the current filter coefficient vector comprises the steps of:
calculating an error contained in the input signal in response to the input signal, the reference signal vector, and the previous filter coefficient vector; and
calculating the current filter coefficient vector in response to the error, the reference signal vector, and the previous filter coefficient vector.

7. The method according to claim 5, wherein the step of outputting the prediction signal comprises the step of calculating the filter coefficient vector and the reference signal vector.

* * * * *